United States Patent

Morgenthaler

[15] 3,707,689

[45] Dec. 26, 1972

[54] ELECTRICAL SIGNAL PROCESSING METHOD AND APPARATUS

[72] Inventor: Frederic R. Morgenthaler, Winchester, Mass.

[73] Assignee: Chu Associates, Inc., Littleton, Mass.

[22] Filed: March 26, 1970

[21] Appl. No.: 22,866

[52] U.S. Cl. ......................333/30 R, 333/71, 332/26, 330/5.5

[51] Int. Cl. ............................H03h 7/30, H03h 9/30

[58] Field of Search ....333/30, 71 M, 72, 71; 332/26, 332/29; 330/5, 5.5; 307/88.3, 229

[56] References Cited

UNITED STATES PATENTS

| | | | |
|---|---|---|---|
| 3,584,210 | 6/1971 | Udall | 235/197 |
| 3,588,529 | 6/1971 | Jordan | 307/229 |
| 3,500,249 | 3/1970 | Kaufman | 307/88.3 |
| 3,302,136 | 1/1967 | Auld | 333/30 |
| 3,444,484 | 5/1969 | Bierig | 333/30 |
| 3,530,302 | 9/1970 | Morgenthaler | 307/88.3 |
| 3,383,632 | 5/1968 | Sparks | 333/30 |
| 3,215,944 | 11/1965 | Matthews | 330/4.6 |
| 3,530,409 | 9/1970 | Vasile | 333/30 |
| 3,307,120 | 2/1967 | Denton | 333/30 |
| 3,309,628 | 3/1967 | Olson | 333/30 |
| 3,353,118 | 11/1967 | Olson | 332/29 |

*Primary Examiner*—Herman Karl Saalbach
*Assistant Examiner*—Saxfield Chatmon, Jr.
*Attorney*—Rines and Rines

[57] ABSTRACT

This disclosure involves a novel and compact pulse network or filter and the like, employing elastic wave-spin wave transduction by means of a non-linear time-varying magnetic bias field, providing increased power handling capability and greater compression ratios than present-day filters, and, in addition, variable broad bandwidth adjustment.

13 Claims, 3 Drawing Figures

PATENTED DEC 26 1972 3,707,689

INVENTOR
FREDERIC R. MORGENTHALER
BY Rines and Rines
ATTORNEYS

ELECTRICAL SIGNAL PROCESSING METHOD AND APPARATUS

The present invention relates to electrical signal-processing methods and apparatus, being more particularly, though not exclusively, directed to producing controlled frequency-dispersive time delay of electric impulses preferably of the type involving frequency-modulated impulses, such as so-called "chirp" pulses and the like useful in radar and similar applications, as described, for example, in the Proceedings of the IEEE, Vol. 56, No. 3, Mar., 1968, pages 273–285.

In my copending application, U.S. Ser. No. 870,478 now U.S. Pat. No. 3,668,568, filed Oct. 6, 1969, for Signal Processing Apparatus and Method, limitations in prior art signal-processing filters, such as magnetostrictive delay lines, as described in said Proceedings, electric networks and other devices, including restrictions in power-handling capability, on achievable pulse compression (or expansion) ratios, and on application to wideband systems, are in large part obviated through employment of an elastic-wave-supporting device or means provided with input and output transducer means for respectively coupling electric impulses thereto to generate and propagate elastic waves therein and for transducing such waves into electric output impulses. A time-varying field is applied to the device during the coupling of said electric impulses into the device by the input transducer means in order to convert the elastic waves to magnon spin waves and to cause different frequencies in said waves to be altered and advanced or delayed in time by different amounts, thereby to introduce time signal-processing into the output impulses.

Such elastic wave-spin wave systems do provide the intended improvement. There are instances, however, where more flexible control over the operating time delay characteristic and bandwidth is desired, including greatly widening the latter; and it is primarily to this improvement of performance, among other objectives, that the present invention is accordingly directed.

An object of the invention, therefore, is to provide a new and improved method of and apparatus for time signal-processing, particularly involving such elastic spin-wave conversions and reconversions, that enable flexible variations and adjustment in wide bandwidth and prescribed delay vs. frequency characteristics.

A further object is to provide a new and improved time signal-processing filter apparatus of more general utility, also.

An additional object is to provide new and improved signal-delay apparatus.

Other and further objects will be hereinafter explained and more fully delineated in the appended claims. In summary, however, from one of its broad aspects, the invention contemplates an electric-impulse signal-processing method and apparatus as above described and in which the time-varying energy field applied to the elastic-wave-supporting medium during the propagation of elastic waves therein, is rendered of substantially non-linear waveform. Preferred details are hereinafter set forth.

The invention will now be described with reference to the accompanying drawing,

FIG. 1 of which is a combined longitudinal section and schematic circuit diagram of a preferred embodiment;

Figure 1:
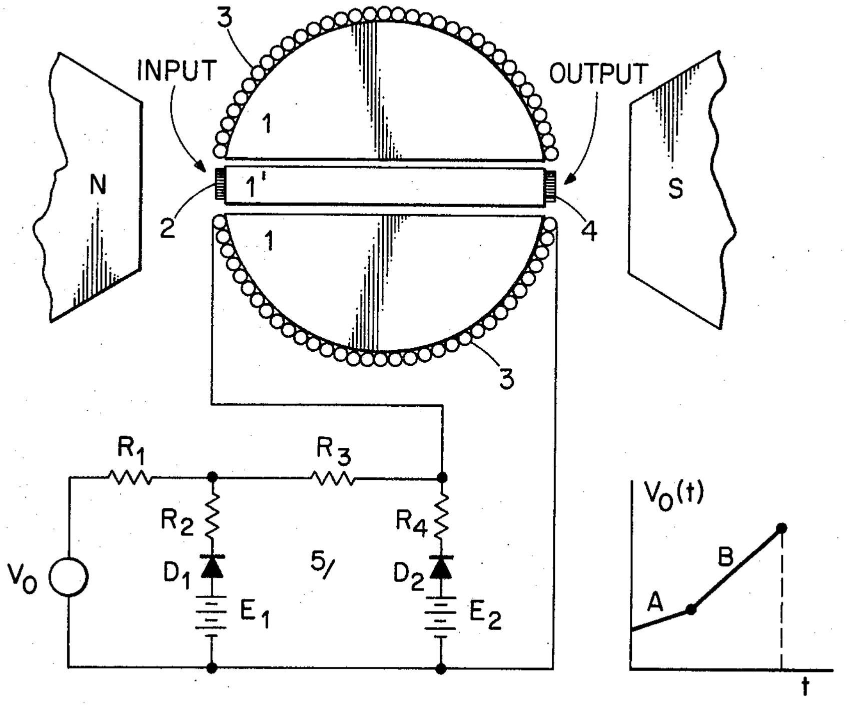

As explained in said copending application, it has been determined that microwave elastic waves (phonons) can be converted into spin waves (magnons), and vice versa, by means of a spatially uniform but time-varying magnetic bias field in a single crystal yttrium iron garnet (YIG), such as is described in my article entitled "Phase-Velocity-Modulated Magnetoelastic Waves" appearing in the Journal of Applied Physics, Vol. 37, No. 8, July, 1966, pages 3326–7. Experiments have verified the theoretical prediction that such conversion occurs at constant wave number and momentum but with variable frequency, energy and power flux. Advantage is taken of this phenomenon, when modified in accordance with the present invention, to provide, among other things, a novel pulse compression or delay filter that is compact, versatile, affords greater compression ratios than conventional filters, is suitable for wideband microwave radar systems and the like, and that has the versatility and flexibility of adjustment of prescribed delay vs. frequency characteristics over wide and controllable bandwidths.

For purposes of illustration, the invention will be described in connection with its application as a chirp impulse compression filter. In its simplest form, the filter consists of a single crystal ferrimagnetic rod (such as YIG) capable of supporting elastic waves and provided with piezoelectric shear and longitudinal elastic wave transducers disposed respectively on the input and output end regions of the rod. A coil would around the crystal is used to produce a transient or time-varying magnetic energy field bias. As explained in my said copending application, if the bias is an approximately linear ramp function, turned on while an input electric chirp signal is introduced or coupled to the rod, it can serve to convert each frequency component of the input shear elastic wave, first to a magnetic spin wave and then to a longitudinal elastic wave of relatively fast velocity compared to the shear wave and of higher frequency that will couple to the output transducer. Because high-frequency components spend more transit time in the rod, proper choice of bias ramp will produce a matched filter output with noise factor improvement. In addition, and because of the frequency translation of the output impulse signal, the pulse compression factor is increased by a factor that is the ratio of the longitudinal to shear wave velocities $V_l/V_s$ — normally a factor of about two. However, the noise within the signal bandwidth is also compressed by the same factor so that the overall noise factor is the same as with standard pulse compression filters.

Such a filter is flexible because the bias current ramp can be altered to match a variety of chirp input impulses; and it is compact because for input pulses of microsecond duration, the crystal may be about one centimeter long. Such a filter is potentially wide band (within the limits of the transducers), moreover, because the linearity of the filter is as good as that of the bias ramp function. In principle, indeed, microsecond to nanosecond compression is possible. The peak bias energy required to filter one such pulse, furthermore, is typically a few millijoules.

In accordance with the present invention, however, the before-mentioned flexibility of adjustment is attained by specially tailoring the ramp waveform; specifically, by using non-linear functions as later described.

Referring to the drawing, a preferred version of such a filter is shown in section in FIG. 1 comprising a sphere of poly-crystalline YIG 1 for example, diametrically cored and provided with a high quality single-crystal cylindrical rod 1′, as of YIG, disposed within the core. Shear-wave (of the appropriate polarization) and longitudinal-wave electric-to-elastic wave transducers (such as CdS or ZnO) are deposited on the parallel and optically flat end faces at 2 and 4, respectively. A solenoid coil 3 is wound about the sphere 1 such that the number of turns per unit length — as projected along the sphere axis — is a constant. The entire structure is magnetized to saturation either by a permanent magnet or an electromagnet. Current is passed through the coil 3 from a ramp generator 5, the waveform being non-linear as shown in the $V_o(t)$ vs. $t$ graph (in this instance two differently sloped segments A and B), producing a substantially uniform spatial magnetic field inside of the sphere which adds a time-varying component to the bias field provided by magnet N-S. The chirped input pulse is applied to the shear-wave input transducer 2, as schematically illustrated by the arrow INPUT, and, during such application, the time-varying non-linear ramp-controlled magnetic energy field produced by the solenoid coil 3 acts upon the system.

In operation, consider a frequency component $\omega$ entering the YIG rod 1′ via the input shear-wave transducer 2 from the chirp impulse at, say, time $t$. At a later time $t_s$, the current ramp from generator 5 will have produced a sufficient magnetic energy field in the solenoid 3 to cause conversion of the shear elastic wave to a spin wave. The component travels a distance $V_s(t_s - t)$ as a shear wave, and then stops (or propagates at a finite small velocity) for a further time interval $(t_l - t_s)$ until longitudinal elastic-wave conversion occurs at time $t_l$. Finally, the component travels a distance $V_l(T - t_l)$ as a longitudinal elastic wave until exiting at the output transducer 4 at time T as an output signal-processed electric impulse, labelled OUTPUT.

For wave propagation parallel to the internal field (which, in turn, is parallel to the rod axis), the dispersion relation ($\omega$ vs. $k$ curve) has the form of a first rising curve, followed by a horizontal plateau, as disclosed in my said article, and then by a continuing or second rising curve. The plateau region can be moved up and down by varying the magnetic field at 5–3, such that, in effect, the spin waves serve as a "magnon elevator," elevating the frequency $\omega$ from the first rising curve to the second curve where the frequency is thus increased (or, on the removal of the ramp, causing the "magnon elevator" to drop back again or reverse). The final frequency that emerges at 4, when the ramp has caused the magnon elevator thus to rise, is thus higher than the input frequency at 2 by the factor $V_l/V_s$ where, as before stated, $V_l$ and $V_s$ are respectively the longitudinal-wave and shear-wave velocities. Since such higher frequency is delayed longer in the device, compression is effected by this frequency-changing (or velocity-changing) time signal processing. Power gain also results from this elevating or conversion action. The power handling capability, indeed, is inherently about 30 db greater than prior art magnetoelastic devices. The time signal-processing is effected, in accordance with the invention, by both the conversion between the types of elastic waves (through the spin-wave conversion) and by the differences in velocity therebetween.

Figure 3:
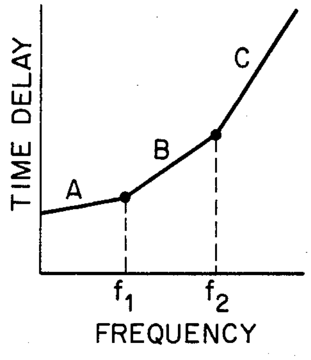
FIG. 3 is an explanatory time-delay vs. frequency graph.

In accordance with the improvement of the present invention, the ramp controlling the application of the magnetic bias field by the coil 3, is adjusted or tailored to special non-linear waveforms which control the rate of ascent and/or descent of the magnon elevator. In this example, the ramp waveform comprises two successive differently sloped segments A and B, produced as the diodes $D_1$ and $D_2$, respectively differently biased at $E_1$ and $E_2$, conduct at different times during the application of increasing voltage from a ramp voltage source $V_o$. With series and shunt resistors $R_1$ and $R_2$ associated with the first diode $D_1$, much greater in value than series and shunt resistors $R_3$ and $R_4$ associated with diode $D_2$, the change in slope B will be produced upon the conduction of $D_2$, following the conduction of $D_1$ that produced segment A. Further diode or similar networks or other non-linear waveform-producing circuits may, of course, also be employed, producing additional different-slope ramp segments, as desired. The normal difference transit time through the elastic medium 1′ of the relatively low and high frequency components of the elastic impulses becomes thus modified by this operation. The delay vs. frequency characteristics, for example, may assume the form of FIG. 3, or with the region B substantially horizontal, or even falling, depending upon the ratios of the slopes of the line segments A, B, C, etc. Through the addition of additional break points in current, as by the three segments A, B and C, the distance between $f_1$ and $f_2$ can be extended, in vernier fashion, thus increasing the width of the broadband response, as desired.

For "up" conversion, the factor $(V_l/V_s)^2$ represents power gain from two sources each contributing a factor $V_l/V_s$. One is due to the energy added to the signal by the time-varying field as it raises the frequency of the spin wave; the other is due to the compression of the signal. For "down" conversion, the factor $(V_l/V_s)^2$ represents power loss from the same two sources, except that in this case energy is removed from the signal as the frequency is lowered; and a similar drop in amplitude accompanies the expansion of the signal.

The non-linear ramp waveform may also turn down, as in opposite polarity to that shown in FIG. 1, and with alternate + and − ramps being applied. If, for example, the ramp rises, flattens and falls, or falls, flattens and rises, the signal energy is returned to its initial state with no net frequency translation, time-scale compression, or requirement for two different types types of transducers (such as longitudinal and shear-wave transducers). Filtering may be thus effected, moreover, using only one type of elastic wave. Not only may elastic shear-wave, spin-wave and elastic longitudinal-wave conversions be effected, as above explained, moreover, but the spin-wave may reconvert back to the original type of elastic wave.

Suitable YIG or related rods may be 1 to 2 centimeters long and 3 millimeters in cross-section, more-or-less; or similar-dimensioned spheres or the like may also be employed. For filtering applications using longitudinal elastic waves, the rod or sphere axis may be in the (100) plane at an angle of about 22.5° from the [100] axis; or in the (110) plane at an angle of about 25.52° from the [100] axis. Filters employing only elastic shear-waves may employ any of the (100), (111) and (110) axes. Wave velocities of about $4 \times 10^5$ cm./sec. for shear waves ($V_s$) and $7 \times 10^5$ cm./sec. for longitudinal waves ($V_l$) will be generated for microwave frequencies. The spin-wave group velocity will be of the order of 2000 cm./sec. at 1 GHZ. The bias fields employed may vary from a few hundred oersteds up to a few thousand; and current pulses of the order of 10 amperes through about 80 turns 3 may be employed, as for a $10^9$ HZ shear-to-longitudinal wave conversion. While the resulting bandwidths may be limited by the transducers, themselves, bandwidths may be varied from about 60 to 100 percent by using one or two ramp breakfronts (differently sloped regions), respectively. Power gains of the order of 5.5 db, excluding dissipation, may be thus obtainable.

Figure 2:
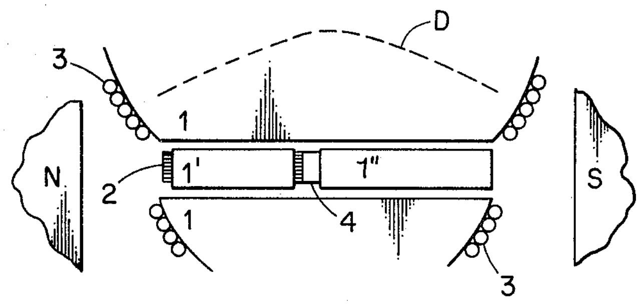
FIG. 2 is a similar fragmentary view of a modification.

If desired, furthermore, the time-varying magnetic field bias may be accompanied by a spatial bias variation, as by adding a polycrystal YIG section 1'', as shown in FIG. 2, to produce the distribution D illustrated there-above. This will serve to tilt the magnon-elevator ascent or descent from the vertical, providing greater power gain and/or independent control of dispersion and time scale compression (or expansion) factor.

Further modifications will also occur to those skilled in this art, and all such are considered to fall within the spirit and scope of the invention as defined in the appended claims.

What is claimed is:

1. A method of changing the difference in the normal transit time through elastic media of relatively low and high frequency components of elastic wave impulses, that comprises, propagating such impulses in an elastic-wave-supporting medium, and during the propagating, converting the impulses between elastic waves and spin waves by subjecting the medium to a transient time-varying energy field of substantially non-linear waveform that has a plurality of successive differently sloped regions and which varies substantially during the transit of an impulse through said medium.

2. A method as claimed in claim 1 and in which said field is magnetic and said propagating comprises introducing one type of elastic wave into said medium which is converted to a spin wave therein, upon which the time-varying energy field acts in the manner of a magnon elevator.

3. A method as claimed in claim 2 and in which the spin wave conversion is followed by conversion into a second type of elastic wave.

4. A method as claimed in claim 3 and in which the said types are relatively slow and fast elastic waves.

5. A method as claimed in claim 2 and in which the spin wave conversion is followed by conversion back to said one type of elastic wave.

6. A method as claimed in claim 2 and in which the time-varying field waveform is applied and removed to cause the magnon elevator action to reverse.

7. A method as claimed in claim 6 and in which the said waveform is applied and removed repetitively.

8. A method as claimed in claim 7 and in which opposite polarity waveforms are alternately applied.

9. A method as claimed in claim 2 and in which said impulses comprise frequency-modulated pulses.

10. A method as claimed in claim 2 and in which said medium comprises YIG crystal material.

11. A method as claimed in claim 2 and in which the field along the medium is adjusted to vary therealong correspondingly to tilt the elevator action of the said magnon elevator.

12. An electric-impulse signal-processing apparatus having, in combination, an elastic-wave-supporting device, input and output transducer means disposed at the device for respectively coupling electric impulses thereto to generate and propagate elastic waves therein and for transducing such waves into electric output impulses, and means for applying a substantially non-linear varying-slope transient time-varying energy field to the device during the coupling of said electric impulses into the device by the input transducer means, and which varies substantially during the transit of an impulse in said device, in order to convert said impulses between elastic waves and spin waves and to cause different frequencies in said waves to be advanced or delayed in time by different amounts, thereby to introduce time signal-processing into the output impulses.

13. An electric-impulse signal-processing apparatus as claimed in claim 12 and in which said field is magnetic and in which the non-linear time-varying energy field acts in the manner of a magnon elevator.

* * * * *